United States Patent
Horesh et al.

(10) Patent No.: US 8,867,707 B2
(45) Date of Patent: Oct. 21, 2014

(54) AUTOMATICALLY UPDATING MEETING INFORMATION

(75) Inventors: Lior Horesh, Ossining, NY (US); Dimitri Kanevsky, Ossining, NY (US); David Nahamoo, Great Neck, NY (US); Tara N. Sainath, New York, NY (US)

(73) Assignee: International Business Machines Corporation, Armonk, NY (US)

(*) Notice: Subject to any disclaimer, the term of this patent is extended or adjusted under 35 U.S.C. 154(b) by 291 days.

(21) Appl. No.: 13/069,591

(22) Filed: Mar. 23, 2011

(65) Prior Publication Data

US 2012/0243670 A1 Sep. 27, 2012

(51) Int. Cl.
*H04M 11/00* (2006.01)
*H04L 12/18* (2006.01)
*H04L 12/58* (2006.01)
*G06Q 10/10* (2012.01)

(52) U.S. Cl.
CPC .......... *G06Q 10/109* (2013.01); *H04L 12/1895* (2013.01); *H04L 51/02* (2013.01)
USPC .................................. 379/88.16; 379/202.01

(58) Field of Classification Search
CPC ............... H04L 12/1818; H04L 51/08; G06Q 10/06311
USPC ...................................................... 379/88.16
See application file for complete search history.

(56) References Cited

U.S. PATENT DOCUMENTS

| 6,104,788 | A * | 8/2000 | Shaffer et al. | 379/93.17 |
|---|---|---|---|---|
| 7,564,958 | B1 | 7/2009 | Contractor | |
| 8,171,080 | B2 * | 5/2012 | Gupta | 709/204 |
| 2007/0116226 | A1 | 5/2007 | Bennett et al. | |
| 2008/0040187 | A1 | 2/2008 | Carraher et al. | |
| 2009/0086948 | A1 | 4/2009 | Narang et al. | |
| 2009/0193087 | A1 | 7/2009 | Lee et al. | |
| 2010/0005142 | A1 | 1/2010 | Xiao et al. | |
| 2010/0076802 | A1 | 3/2010 | Bhogal et al. | |

FOREIGN PATENT DOCUMENTS

JP 2005190314 7/2005

OTHER PUBLICATIONS

Cole et al., Change-Notification Service for Shared Files, IBM TDB v36 n8 08-93 pp. 7-82, Aug. 1, 1993.
Counts, Analog and Mixed-Signal Innovation: The Process-Circuit-System-Application Interaction, IEEE International Solid-State Circuits Conference, 2007. ISSCC 2007. Digest of Technical Papers., 2007, pp. 24-30.
Al-Jaroodi et al., Analysis of Web Alert Models, 2009 International Conference on Network-Based Information Systems, pp. 398-403.

* cited by examiner

*Primary Examiner* — Amal Zenati
(74) *Attorney, Agent, or Firm* — Ryan, Mason & Lewis, LLP

(57) ABSTRACT

Techniques for automatically providing updated meeting information are provided. The techniques include facilitating receipt of a message pertaining to a meeting, automatically interpreting the message to determine if the message requires that meeting information be changed, automatically updating the meeting information if a change is required from the message, and automatically sending a message to each meeting participant informing each participant of the updated meeting information.

19 Claims, 3 Drawing Sheets

| TYPE OF DATA | EXAMPLES |
|---|---|
| CALENDAR DATA | MEETINGS, TRAVEL |
| ADDITIONAL DATA | GPS, TRAVEL TIME |
| SERVICE DATA | HEALTH |
| PERSONAL MESSAGES | USER IS IN TRAFFIC |
| WEATHER EVENT | SNOWSTORM, RAINING |
| INTERNET NEWS | CATASTROPHIC EVENTS, WAR |

AUTOMATICALLY UPDATING MEETING INFORMATION

FIELD OF THE INVENTION

Embodiments of the invention generally relate to information technology, and, more particularly, to communication technology.

BACKGROUND OF THE INVENTION

In the context of conference call scheduling, oftentimes, the calls are cancelled or moved to different times. Participants of the calls, however, may not receive warning about such changes in a timely and efficient manner. Also, rooms that were scheduled for participants that may meet in person for a changed/cancelled conference call can remain assigned to the call rather than be freed for other assignments or uses.

SUMMARY OF THE INVENTION

Principles and embodiments of the invention provide techniques for automatically updating meeting information. An exemplary method (which may be computer-implemented) for automatically providing updated meeting information, according to one aspect of the invention, can include steps of facilitating receipt of a message pertaining to a meeting, automatically interpreting the message to determine if the message requires that meeting information be changed, automatically updating the meeting information if a change is required from the message, and automatically sending a message to each meeting participant informing each participant of the updated meeting information.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include advance warning and change control system for conference calls. One or more embodiments of the invention include using text messages services associated with conference call facilities and services. When changes in conference call setting occur, text messages can be sent to all participants (for example, to their cell phones) informing the participants about changes. By way of example, text messages can be sent to an automatic room reservation system, which includes an intelligent processor that recognizes text messages content. The processor processes and recognizes information such as, for example, that a room should be cancelled or moved to another time slot or location.

Accordingly, one or more embodiments of the invention includes a meeting scheduling system for automatically providing updated meeting information notifications via, for example, text messages, e-mail, instant messages, and/or telephone calls. Information provided to participants can include information about, for example, meeting location, meeting time, and/or meeting updates, as needed. One or more embodiments of the invention can additionally include an automatic speech recognition component for receiving and recognizing user input (regarding, for example, meeting time, meeting location, and/or meeting participant information). Further, one or more embodiments of the invention also include a natural language processing component to receive and interpret textual user input.

The techniques detailed herein additionally include enabling a moderator to enter a pass-code and record meeting updates (such as, for example, "moderator will be late, start call and discuss X. and Y," "meeting has been canceled," "your participation in this call is no longer required," etc.). As described herein, one or more embodiments of the invention can also include an extension to notify call/conference participants via text message or instant message to communicate any updates.

Accordingly, by way of example, if a meeting time or meeting room changes, one or more embodiments of the invention include automatically notifying participants of changes by text message, instant message, e-mail, phone call, etc. and automatically adding meeting services on demand (such as, for example, transcription services, translation services, etc., based on listed participants).

Figure 1:
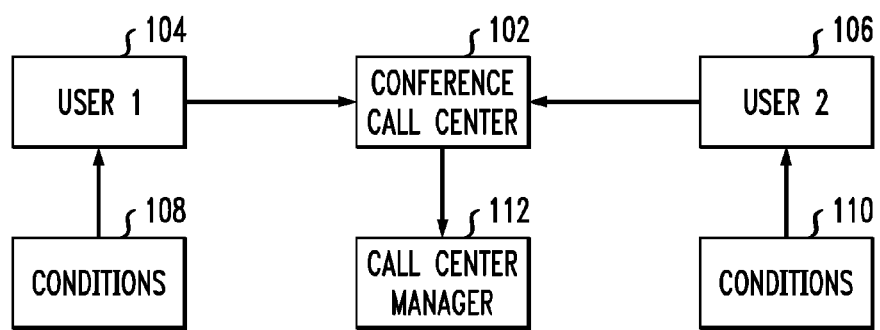
FIG. 1 is a diagram illustrating system architecture, according to an embodiment of the present invention.

FIG. 1 is a diagram illustrating system architecture, according to an embodiment of the present invention. By way of illustration, FIG. 1 depicts a conference call center module 102, users 104 and 106, user condition modules 108 and 110 (respectively), and a call center manager module 112. As depicted in FIG. 1, each of the users (104 and 106) analyzes his or her current conditions (108 and 110, respectively). If a meeting/conference call needs to be changed, the users inform the conference call center module 102. The conference call center module then contacts the call center manager module 112, which broadcasts the change in conference room to all scheduled participants.

Figure 2:
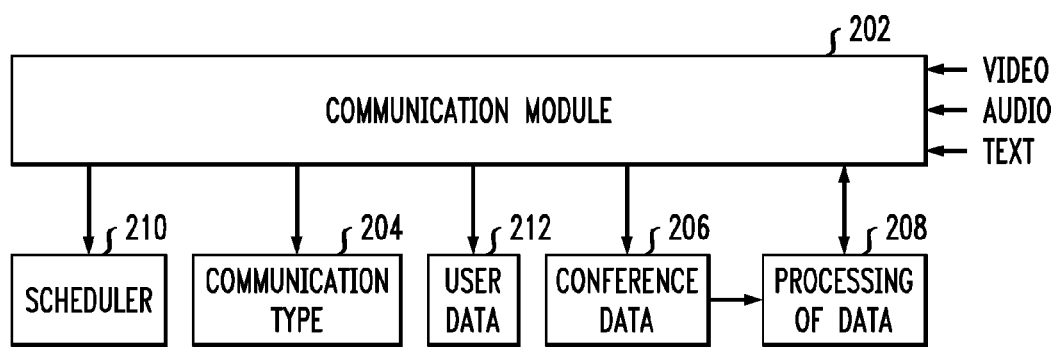
FIG. 2 is a diagram illustrating call center manager architecture, according to an embodiment of the present invention.

FIG. 2 is a diagram illustrating call center manager architecture, according to an embodiment of the present invention. By way of illustration, FIG. 2 depicts a communication module 202 (which can process audio, text, video, etc.), a communication type module 204 (means for how module 202 communicates (for example, via twitter, phone, email fax, etc.)), a conference data module 206 (including data such as place, location, callers, time, etc.), and a processing of data module 208 (including ASR, text processing, semantic understanding, etc.). FIG. 2 also depicts a scheduler component 210, which sends messages to others regarding updates on schedules, as well as a user data module 212, which includes information about users (for example, travels, location, conditions, etc.).

FIG. 2 provides detailed architecture of the call center manager (module 112 in FIG. 1). The call center manager module takes as input video, text, audio, etc. via communication module 202. The call center manager interprets the data via data processing module 208 to determine if an action should be taken in rescheduling the meeting and informing users. If an action is necessary, communication module 202 determines the appropriate type of communication type (via module 204) to relay the message, and relays this message to the user data module 212, the scheduler module 210, and the conference data module 206.

Figures 3, 4:
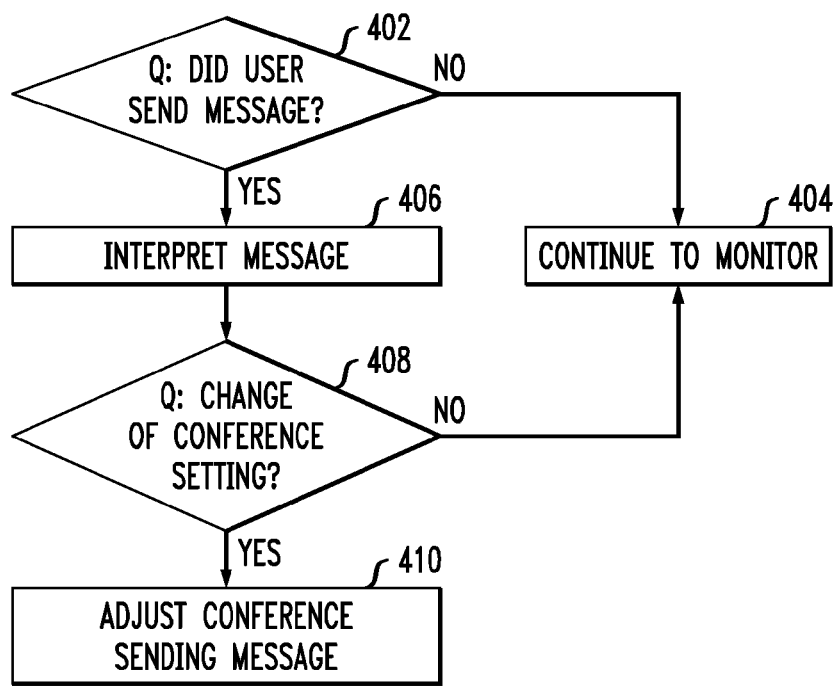
FIG. 3 is a table illustrating example user data, according to an embodiment of the present invention.
FIG. 4 is a diagram illustrating techniques for adjusting conference settings, according to an embodiment of the present invention.

FIG. 3 is a table 302 illustrating example user data, according to an embodiment of the present invention. By way of illustration, FIG. 3 depicts an example of information contained with user condition modules (modules 108 and 110 in FIG. 1) that is used to determine if there is a conflict in a scheduled meeting and if the meeting needs to be rescheduled.

FIG. 4 is a flow diagram illustrating techniques for adjusting conference settings, according to an embodiment of the present invention. Step 402 includes determining if the user sent a message to the conference module. If no (that is, the user did not send a message to the conference module), the techniques continue to monitor for user messages in step 404. If yes (that is, the user did send a message to the conference module), the techniques proceed to interpret the message in step 406. Step 408 includes determining if the message requires that the conference setting be changed. If no change is required, the techniques return to step 404. If a change is required, the techniques proceed to step 410 to adjust the conference sending messages.

Figure 5:
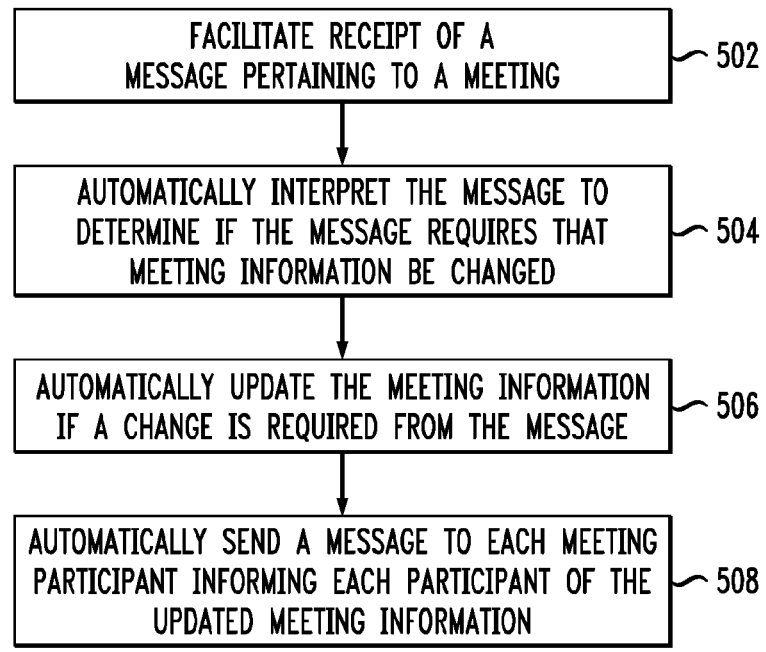
FIG. 5 is a flow diagram illustrating techniques for automatically providing updated meeting information, according to an embodiment of the invention.

FIG. 5 is a flow diagram illustrating techniques for automatically providing updated meeting information, according to an embodiment of the present invention. Meeting information can include, for example, meeting time, meeting location, and/or identification of one or more meeting participants. Step 502 includes facilitating receipt of a message pertaining to a meeting. This step can be carried out, for example, using a call center manager module. The message can be sent, for example, from a meeting participant and/or a meeting moderator.

Step 504 includes automatically interpreting the message to determine if the message requires that meeting information be changed. This step can be carried out, for example, using a call center manager module. Automatically interpreting the message can include using an automatic speech recognition component to receive and recognize audio message input, as well as using a natural language processing component to receive and interpret textual message input.

Step 506 includes automatically updating the meeting information if a change is required from the message. This step can be carried out, for example, using a communication module, a conference data module and/or a processing of data module.

Step 508 includes automatically sending a message to each meeting participant informing each participant of the updated meeting information. This step can be carried out, for example, using a scheduler component. Automatically sending a message to each meeting participant informing each participant of the updated meeting information can include sending a text message to each meeting participant informing each participant of the updated meeting information, sending an instant message to each meeting participant informing each participant of the updated meeting information, and/or placing a telephone call to each participant informing each participant of the updated meeting information.

Further, the techniques depicted in FIG. 5 can also include enabling a moderator to enter a pass-code and record one or more meeting updates.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a conference call center module, a call center manager module, a communication module, a communication type module, a user data module, a conference data module, a data processing module and a scheduler module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
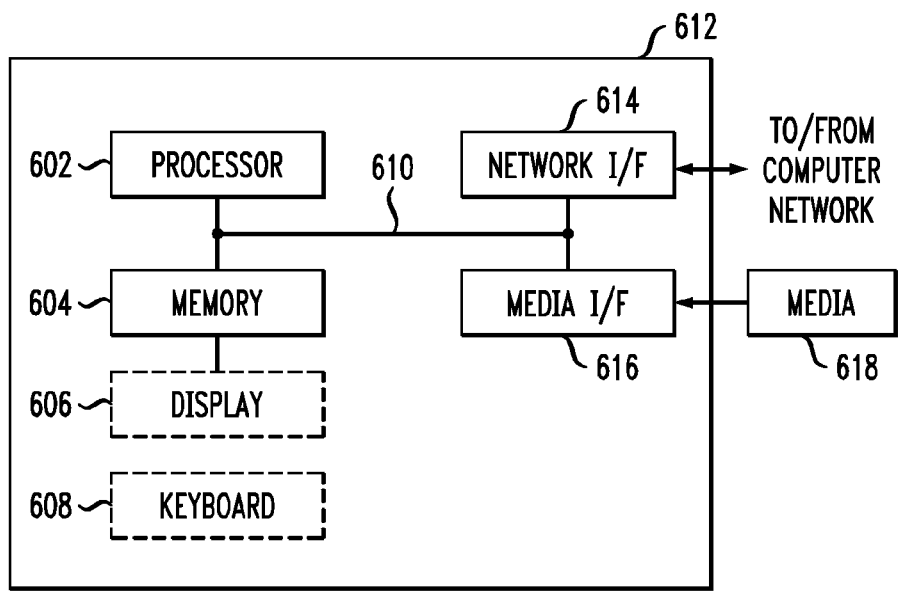
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1 and FIG. 2. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing an intelligent processor that recognizes and processes text message content that a room for a conference or meeting should be cancelled or moved to another time slot or location.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for automatically providing updated meeting information, wherein the method comprises:
   facilitating receipt of a message pertaining to a meeting from a user associated with said meeting;
   automatically interpreting the message to identify content in the message associated with the meeting to determine if the message requires that meeting information be changed; automatically updating the meeting information if a change is required from the message; determining a message communication type to be used for sending a message to each meeting participant based on information pertaining to each meeting participant, wherein the message communication type comprises at least one of voice message, text message and instant message;
   automatically sending a message to each meeting participant informing each participant of the updated meeting information, wherein the message is sent to each meeting participant in accordance with the corresponding determined message communication type; and
   automatically adding at least one meeting service based on identification of each meeting participant; wherein said at least one meeting service comprises at least one of a transcription service and a translation service.

2. The method of claim 1, wherein meeting information comprises at least one of meeting time, meeting location, and identification of one or more meeting participants.

3. The method of claim 1, wherein automatically interpreting the message to determine if the message requires that meeting information be changed comprises using an automatic speech recognition component to receive and recognize audio message input.

4. The method of claim 1, wherein automatically interpreting the message to determine if the message requires that meeting information be changed comprises using a natural language processing component to receive and interpret textual message input.

5. The method of claim 1, wherein automatically sending a message to each meeting participant informing each participant of the updated meeting information comprises sending a text message to each meeting participant informing each participant of the updated meeting information.

6. The method of claim 1, wherein automatically sending a message to each meeting participant informing each participant of the updated meeting information comprises sending an instant message to each meeting participant informing each participant of the updated meeting information.

7. The method of claim 1, wherein automatically sending a message to each meeting participant informing each participant of the updated meeting information comprises placing a telephone call to each participant informing each participant of the updated meeting information.

8. The method of claim 1, further comprising enabling a moderator to enter a pass-code and record one or more meeting updates.

9. The method of claim 1, wherein the message is sent from one of a meeting participant and a meeting moderator.

10. A computer program product comprising a non-transitory computer readable recordable storage medium including computer useable program code for automatically providing updated meeting information, the computer program product including:
    computer useable program code for facilitating receipt of a message pertaining to a meeting from a user associated with said meeting;
    computer useable program code for automatically interpreting the message to identify content in the message associated with the meeting to determine if the message requires that meeting information be changed;
    computer useable program code for automatically updating the meeting information if a change is required from the message;
    computer useable program code for determining a message communication type to be used for sending a message to each meeting participant based on information pertaining to each meeting participant, wherein the message communication type comprises at least one of voice message, text message and instant message;
    computer useable program code for automatically sending a message to each meeting participant informing each participant of the updated meeting information, wherein the message is sent to each meeting participant in accordance with the corresponding determined message communication type; and
    automatically adding at least one meeting service based on identification of each meeting participant; wherein said at least one meeting service comprises at least one of a transcription service and a translation service.

11. The computer program product of claim 10, wherein meeting information comprises at least one of meeting time, meeting location, and identification of one or more meeting participants.

12. The computer program product of claim 10, wherein the computer useable program code for automatically interpreting the message to determine if the message requires that meeting information be changed comprises computer useable program code for using an automatic speech recognition component to receive and recognize audio message input.

13. The computer program product of claim 10, wherein the computer useable program code for automatically interpreting the message to determine if the message requires that meeting information be changed comprises computer useable program code for using a natural language processing component to receive and interpret textual message input.

14. The computer program product of claim 10, further comprising computer useable program code for enabling a moderator to enter a pass-code and record one or more meeting updates.

15. A system for automatically providing updated meeting information, comprising: a memory; and at least one processor coupled to the memory and operative to:
    facilitating receipt of a message pertaining to a meeting from a user associated with said meeting;
    automatically interpret the message to identify content in the message associated with the meeting to determine if the message requires that meeting information be changed;
    automatically update the meeting information if a change is required from the message; determine a message communication type to be used for sending a message to each meeting participant based on information pertaining to each meeting participant, wherein the message communication type comprises at least one of voice message, text message and instant message;
    automatically send a message to each meeting participant informing each participant of the updated meeting information, wherein the message is sent to each meeting participant in accordance with the corresponding determined message communication type; and
    automatically add at least one meeting service based on identification of each meeting participant; wherein said at least one meeting service comprises at least one of a transcription service and a translation service.

16. The system of claim 15, wherein meeting information comprises at least one of meeting time, meeting location, and identification of one or more meeting participants.

17. The system of claim 15, wherein the at least one processor coupled to the memory operative to automatically interpret the message to determine if the message requires that meeting information be changed is further operative to use an automatic speech recognition component to receive and recognize audio message input.

18. The system of claim 15, wherein the at least one processor coupled to the memory operative to automatically interpret the message to determine if the message requires that meeting information be changed is further operative to use a natural language processing component to receive and interpret textual message input.

19. The system of claim 15, wherein the at least one processor coupled to the memory is further operative to enable a moderator to enter a pass-code and record one or more meeting updates.

* * * * *